United States Patent
Harmon et al.

(10) Patent No.: US 12,457,920 B2
(45) Date of Patent: Nov. 4, 2025

(54) INTERMEDIATE TANKS FOR FRAME WEIGHT DISTRIBUTION

(71) Applicant: Deere & Company, Moline, IL (US)

(72) Inventors: Andrew W. Harmon, Geneseo, IL (US); Gerald E. Rains, Eldridge, IA (US)

(73) Assignee: Deere & Company, Moline, IL (US)

( * ) Notice: Subject to any disclaimer, the term of this patent is extended or adjusted under 35 U.S.C. 154(b) by 465 days.

(21) Appl. No.: 18/122,195

(22) Filed: Mar. 16, 2023

(65) Prior Publication Data

US 2024/0065139 A1 Feb. 29, 2024

Related U.S. Application Data

(60) Provisional application No. 63/401,766, filed on Aug. 29, 2022.

(51) Int. Cl.
*A01C 17/00* (2006.01)
*A01C 7/20* (2006.01)

(52) U.S. Cl.
CPC .............. *A01C 17/008* (2013.01); *A01C 7/20* (2013.01)

(58) Field of Classification Search
CPC ..... A01C 17/008; A01C 17/006; A01C 17/00; A01C 7/20
See application file for complete search history.

(56) References Cited

U.S. PATENT DOCUMENTS

| | | |
|---|---|---|
| 2010/0101469 A1 | 4/2010 | Landphair et al. |
| 2015/0013579 A1 | 1/2015 | Mariman et al. |
| 2023/0345859 A1 | 11/2023 | Rains |

FOREIGN PATENT DOCUMENTS

EP    1212933 A2    6/2002

OTHER PUBLICATIONS

Extended European Search Report and Written Opinion issued in European Patent Application No. 23181235.5, dated Dec. 14, 2023, in 10 pages.

*Primary Examiner* — Christopher J. Novosad
(74) *Attorney, Agent, or Firm* — Taft Stettinius & Hollister LLP; Stephen F. Rost

(57) ABSTRACT

A system for distributing commodity across an agricultural machine includes a product storage system, including a central commodity tank and a plurality of intermediate commodity tanks positioned at various locations laterally across a frame. The system includes a movable manifold coupled to the one central commodity tank, and the manifold is adjustable by a controller to control volume of commodity distributed to the intermediate commodity tanks. Each intermediate commodity tank distributes commodity to a separate plurality of row units, which distribute commodity to the soil. Operatively coupled to the controller are one or more sensors, which measure product characteristics, such as volume of commodity in the intermediate tanks, and operational characteristics, such as downforce of the row units. The controller is configured to adjust the manifold to control distribution of commodity across the intermediate tanks based on measured values from the sensors and desired values stored in the controller.

20 Claims, 5 Drawing Sheets

INTERMEDIATE TANKS FOR FRAME WEIGHT DISTRIBUTION

RELATED DISCLOSURES

This application claims priority to U.S. Provisional Application Ser. No. 63/401,766, filed Aug. 29, 2022, the disclosure of which is hereby incorporated by reference in its entirety.

FIELD OF THE DISCLOSURE

The present disclosure relates to commodity distribution for an agricultural machine, and more particularly to a commodity distribution system and method for moving a desired volume of commodity to intermediate tanks positioned on the agricultural machine.

BACKGROUND OF THE DISCLOSURE

Many conventional agricultural machines, in particular agricultural machines such as planters, include a frame. Some such agricultural machines include a center portion of the frame and various other portions of the frame arranged laterally outward from the center portion. Each portion of the frame may include a plurality of row units configured to engage with the ground and deliver commodity at a desired soil depth.

Especially as planters increase in size (e.g., lateral length), problems may result from having insufficient downforce at the row units that are coupled to certain sections of the frame, especially at those sections of the frame arranged laterally outward from the center. What is needed is a system and method for meeting downforce requirements at various sections of the frame.

SUMMARY

In an illustrative embodiment, a system for distributing commodity for an agricultural machine comprises: a frame including: a center section, a first wing section pivotably coupled to the center section, and a second wing section pivotably coupled to the center section and positioned opposite the first wing section; a product storage system including: (i) at least one central commodity tank configured to store commodity usable in an operation of the agricultural machine; (ii) a first intermediate tank positioned on the first wing section of the frame and configured to receive commodity from the at least one central commodity tank; and (iii) a second intermediate tank positioned on the second wing section of the frame and configured to receive commodity from the at least one central commodity tank; a manifold coupled to the at least one central commodity tank, wherein the manifold is movable to control volume of commodity distributed to the first intermediate tank and the second intermediate tank; a first group of row units configured to receive commodity from the first intermediate tank and to distribute the commodity to the terrain traversed by the agricultural machine; a second group of row units configured to receive commodity from the second intermediate tank and to distribute the commodity to the terrain traversed by the agricultural machine; a first plurality of sensors configured to measure the downforce of the first group of row units; a second plurality of sensors configured to measure the downforce of the second group of row units; a controller operatively coupled to the first plurality of sensors and the second plurality of sensors and configured to receive signals therefrom indicative of the measured downforce of the first group of row units and the second group of row units; wherein the controller is operatively coupled to the manifold and configured to move the manifold in response to the measured downforce of the first group of row units and the second group of row units.

In some embodiments, the controller is configured to compare the measured downforce of the first group of row units to a desired downforce of the first group of row; and in response to determining that the measured downforce of the first group of row units is less than the desired downforce of the first group of row units, the controller is configured to move the manifold such that additional commodity is distributed to the first intermediate tank.

In some embodiments, the system further comprises an additional sensor operatively coupled to the controller and configured to measure the volume of commodity in the first intermediate tank; wherein the additional sensor is configured to send signals to the controller indicative of the volume of commodity in the first intermediate tank; wherein the controller is configured to compare the measured volume in the first intermediate tank to a predetermined volume maximum of the first intermediate tank; and wherein if the measured volume is greater than the predetermined volume maximum, the controller does not cause the manifold to distribute additional commodity to the first intermediate tank.

In some embodiments, the at least one central commodity tank is not positioned on the first wing section or the second wing section of the frame. In some embodiments, the at least one central commodity tank is not positioned on the frame.

In some embodiments, the system further comprises: a first main supply hose coupled at a first end to the at least one central commodity tank and at a second end to the first intermediate tank; and a second main supply hose coupled at a first end to the at least one central commodity tank and at a second end to the second intermediate tank.

In some embodiments, the system further comprises: a first secondary supply hose coupled at a first end to the first intermediate tank and at a second end to a first row unit of the first group of row units; and a second secondary supply hose coupled at a first end to the first intermediate tank and at a second end to a second row unit of the first group of row units.

In some embodiments, the first intermediate tank and the second intermediate tank are included in a plurality of intermediate tanks, at least two of which are coupled together to facilitate transfer of commodity therebetween.

In some embodiments, the system further comprises: a first actuator coupled to the center section and to the first wing section; a second actuator coupled to the center section and to the second wing section; wherein the controller is configured to adjust at least one of the first actuator and the second actuator to redistribute weight across the frame. In some embodiments, wherein the controller is configured to adjust at least one of the first actuator and the second actuator to redistribute weight across the frame in response to the measured downforce of the first group of row units and the second group of row units.

In some embodiments, the system further comprises: a first actuator coupled to the center section and to the first wing section; a second actuator coupled to the center section and to the second wing section; wherein in response to the measured downforce of the first group of row units and the second group of row units, the controller is configured to adjust the at least one of the first actuator and the second actuator to a predetermined limit prior to moving the manifold.

In some embodiments, the system further comprises: a first actuator coupled to the center section and to the first wing section; a second actuator coupled to the center section and to the second wing section; wherein in response to the measured downforce of the first group of row units and the second group of row units, the controller is configured to move the manifold to cause commodity to be distributed to at least one of the first intermediate tank and the second intermediate tank to a predetermined limit prior to adjusting the at least one of the first actuator and the second actuator.

In another illustrative embodiment, a system for distributing commodity for an agricultural machine comprises: a frame extending laterally to include a first side and a second side; a product storage system including: (i) at least one central commodity tank configured to store commodity usable in an operation of the agricultural machine; (ii) a first intermediate tank positioned on the first side of the frame and configured to receive commodity from the at least one central commodity tank; and (iii) a second intermediate tank positioned on the second side of the frame and configured to receive commodity from the at least one central commodity tank; a manifold coupled to the at least one central commodity tank, wherein the manifold is movable between positions to control volume of commodity distributed to the first intermediate tank and the second intermediate tank; a first group of row units configured to receive commodity from the first intermediate tank and to distribute the commodity to the terrain traversed by the agricultural machine; a second group of row units configured to receive commodity from the second intermediate tank and to distribute the commodity to the terrain traversed by the agricultural machine; a first sensor configured to measure the volume of commodity in the first intermediate tank; a second sensor configured to measure the volume of commodity in the second intermediate tank; a controller operatively coupled to the first sensor and the second sensor and configured to receive signals therefrom indicative of the volume of commodity in the first intermediate tank and the second intermediate tank, respectively; wherein the controller is configured to compare the measured volume of commodity in the first intermediate tank and the second intermediate tank to predetermined volume maximums for the first intermediate tank and the second intermediate tank, respectively; and wherein if the measured volume of commodity in the first intermediate tank or the second intermediate tank is below the predetermined volume maximum, the controller is configured to move the manifold to cause distribution of additional commodity to the first intermediate tank or the second intermediate tank, respectively.

In some embodiments, the predetermined volume maximums for the first intermediate tank and the second intermediate tank are at least 75% of the total volume of the first intermediate tank and the second intermediate tank, respectively. In some embodiments, the predetermined volume maximums for the first intermediate tank and the second intermediate tank are at least 90% of the total volume of the first intermediate tank and the second intermediate tank, respectively. In some embodiments, the controller is configured to compare the measured downforce of the first group of row units to a desired downforce of the first group of row; and wherein in response to determining that the measured downforce of the first group of row units is less than the desired downforce of the first group of row units, the controller is configured to move the manifold such that additional commodity is distributed to the first intermediate tank causing the volume of commodity in the first intermediate tank to exceed the volume maximum for the first intermediate tank.

In some embodiments, if the measured volume of commodity in the first intermediate tank is greater than an additional predetermined volume maximum for the first intermediate tank, which is greater than the predetermined volume maximum, then the controller does not cause the manifold to distribute additional commodity to the first intermediate tank.

In some embodiments, a method of distributing commodity for an agricultural machine comprises: distributing commodity from at least one central commodity tank to a first intermediate tank positioned on a first side of a frame; distributing commodity from the at least one central commodity tank to a second intermediate tank positioned on a second side of the frame; distributing commodity from the first intermediate tank to a first group of row units coupled to the frame, which distribute the commodity to the terrain being traversed by the agricultural machine; distributing commodity from the second intermediate tank to a second group of row units coupled to the frame, which distribute the commodity to the terrain being traversed by the agricultural machine; adjusting a manifold coupled to the at least one central commodity tank to stop distribution of commodity to the first intermediate tank and the second intermediate tank; re-adjusting the manifold in response to characteristics of the terrain to be traversed by the agricultural machine, wherein re-adjusting the manifold includes distributing additional commodity to at least one of the first intermediate tank and the second intermediate tank.

In some embodiments, re-adjusting the manifold in response to characteristics of the terrain to be traversed by the agricultural machine includes: analyzing a contour map of the terrain to be traverse by the agricultural machine; and re-adjusting the manifold in response to the contour map of the terrain to be traverse by the agricultural machine.

In some embodiments, the method further comprises: sensing a characteristic of the soil during operation of the agricultural machine prior to the first group of row units or the second group of row units traversing the soil; wherein re-adjusting the manifold in response to characteristics of the terrain to be traversed by the agricultural machine includes: re-adjusting the manifold in response to the sensed characteristic of the soil.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 5 shows that the controller includes a memory and processor configured to execute instructions stored on the memory to cause distribution of commodity to each intermediate tank based on data stored in the memory or measured by the sensors and provided to the controller.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
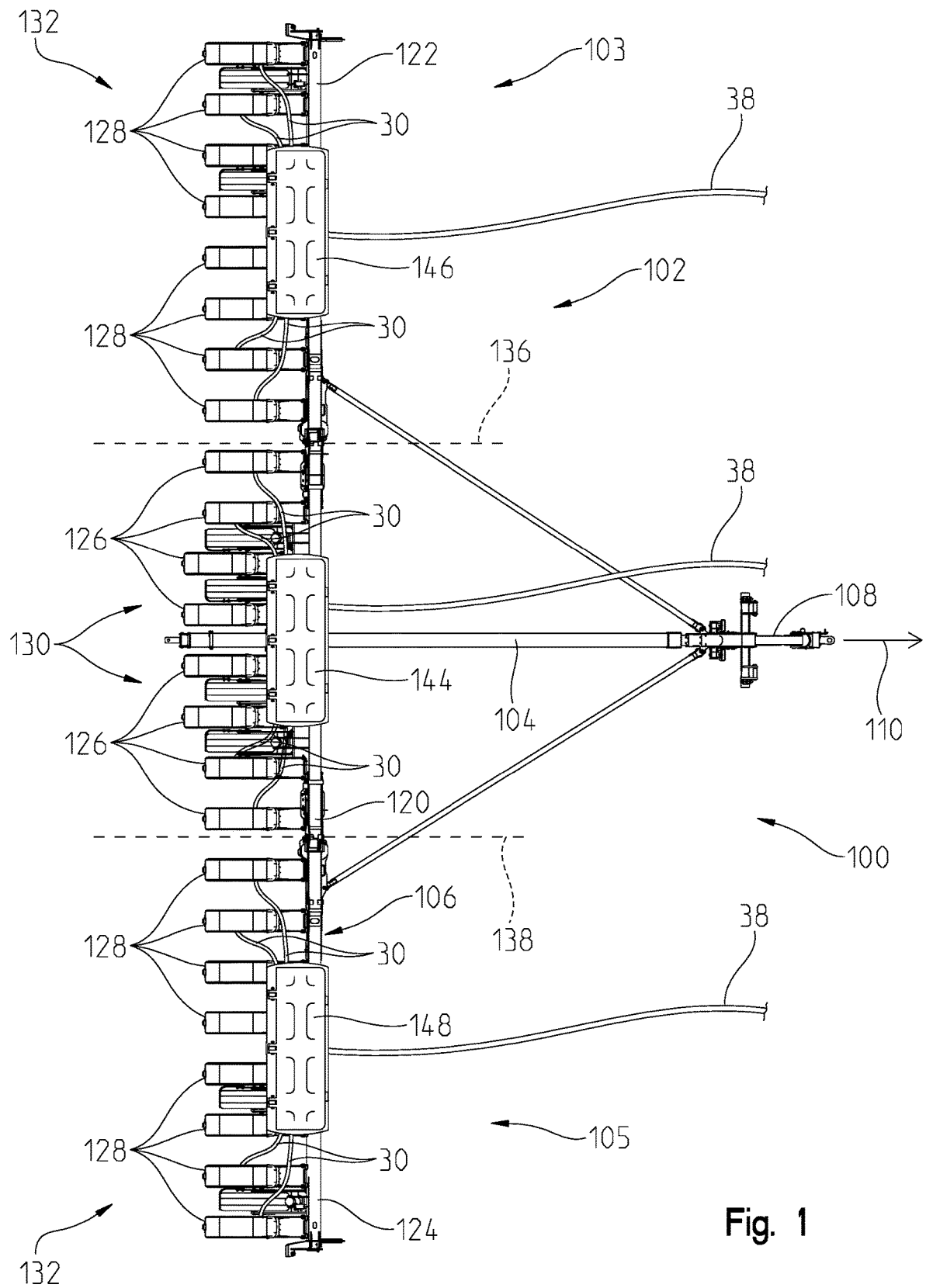
FIG. 1 is a top down view of an agricultural machine including a plurality of intermediate tanks configured to receive commodity from at least one central commodity tank and distribute the commodity to respective groups of row units.

In FIG. 1 of the present disclosure, an illustrative embodiment of an agricultural machine 100 is embodied as a row crop planter. The agricultural machine 100 includes a frame 102 having a draw bar 104 and a tool bar 106 spanning laterally to define a width of the frame 102. At the forward end of the draw bar 104 is a tongue 108 for coupling the frame 102 to a towing vehicle such as a tractor. The frame 102 is shown as having a center section 120, a first wing section 122, and a second wing section 124. The first and second wing sections 122, 124 extend laterally away from the center section 120 in opposite directions. The frame 102 include a first side 103 and a second side 105, which include the first and second wings sections 122, 124, respectively. During operation, a towing vehicle, such as a tractor, may pull the agricultural machine 100 in a forward direction 110, as shown in FIG. 1. The center section 120 and each wing section 122, 124 may be supported above the ground by wheel assemblies including wheels, such as those described in U.S. application Ser. No. 17/731,643. The disclosure of U.S. application Ser. No. 17/731,643 is hereby incorporated by reference in its entirety.

The first and second wing sections 122, 124 may be pivotably coupled to the center section 120 for rotation about fore and aft extending axes 136 and 138. The pivot-type connection allows the wing sections 122, 124 to follow the ground contour as the agricultural machine 100 moves through a field. In the illustrative embodiment, the agricultural machine 100 includes first and second actuators 150, 152. The first actuator 150 is positioned between and coupled to the center section 120 of the frame 102 and the first wing section 122 of the frame 102. The second actuator 152 is positioned between and coupled to the center section 120 of the frame 102 and the second wing section 124 of the frame 102. In the illustrative embodiment, the actuators 150, 152 span across the fore and aft extending axes 136, 138, respectively. As the actuators 150, 152 extend and retract, more or less force may be applied to the respective wing sections 122, 124 from the center section 120.

The actuators 122, 124 may cooperate with other components of the agricultural machine 100 to achieve a desired downforce margin for row units of various sections of the frame 102. Downforce margin may be used to determine whether sufficient downforce is available to deliver commodity at a desired depth to the soil. Downforce margin may be calculated as the inherent weight of a row unit, plus the downward force applied by the row unit, less the soil penetration resistance. If the soil penetration resistance is too great or the terrain is uneven such that the row units have a tendency to lift from the ground, additional downforce may be needed at certain sections of the frame 102. The commodity distribution process described herein may provide the additional downforce that is needed at certain sections of the frame 102.

Referring again to FIG. 1, a first plurality of row units 126 may be coupled to the center section 120 of the frame 102, and a second plurality of row units 128 may be coupled to the first and second wing sections 122, 124 of the frame 102. Description of the row units 128 applies equally to the row units 126 herein, and description of a single component (e.g., row unit) should be understood to apply to the corresponding plurality of those components.

While an exemplary agricultural machine 100, such as a drawn planter type implement with center and wing sections of a frame 102, is shown in FIG. 1, it should be appreciated that this disclosure is not limited to the implement shown in FIG. 1. The agricultural machine contemplated by this disclosure may take many forms so long as the agricultural machine is suitable to perform the commodity distribution processes described herein. This may include a drawn planter, an integrated planter, or any other variety of machine with a laterally extending frame that facilitates distribution commodity in an agricultural operation.

Referring still to FIG. 1, the agricultural machine 100 includes a product storage system 140 for storing commodity used during operation of the agricultural machine 100. The product storage system 140 may include at least one central commodity tank 142 and at least one intermediate tank, such as intermediate tanks 144, 146, 148 shown in FIG. 1.

The at least one central commodity tank 142 may take several different forms. For example, in some embodiments, the central commodity tank 142 may be of the type often included on a tow behind commodity cart for an air seeder, such that it is spaced apart from the frame 102. In other embodiments, the central commodity tank 142 may be positioned adjacent the intermediate tank 144 on the center section 120 of the frame 102. In other embodiments, the agricultural machine 100 may not include a central commodity tank 142, and instead the agricultural machine 100 may include an elongated intermediate tank spanning laterally across multiple sections of a frame.

Figure 2:
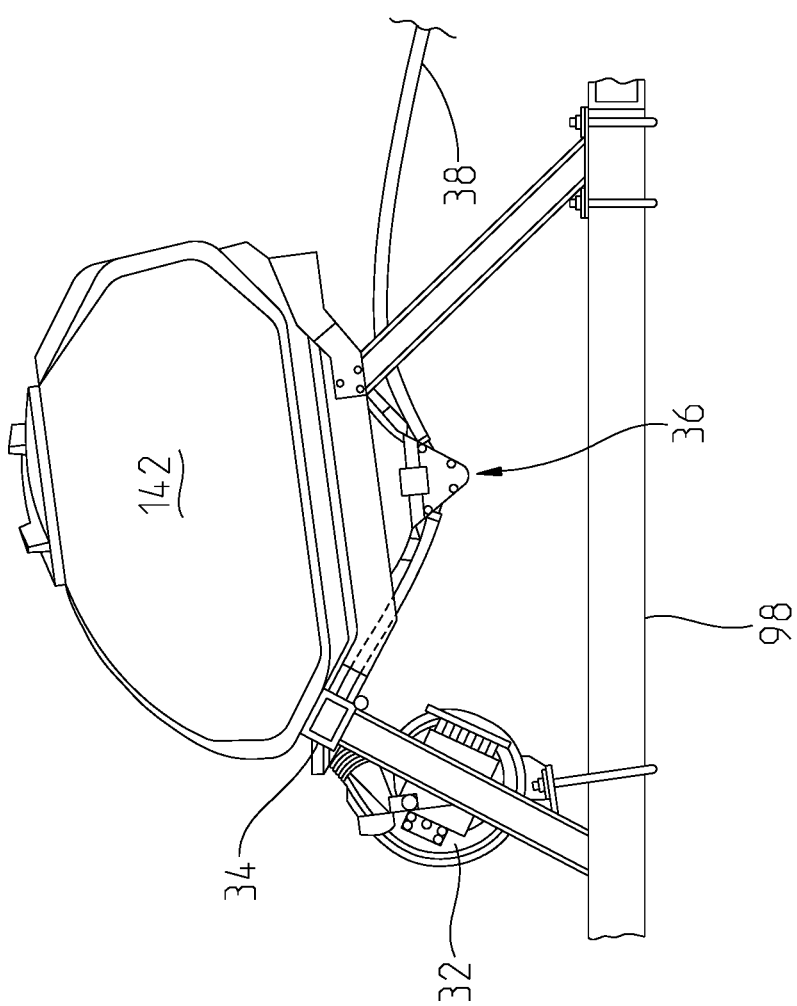
FIG. 2 is a side view a central commodity tank of an agricultural machine that distributes seed to intermediate tanks via a main supply hose.

In some embodiments, the central commodity tank 142 may be of the type shown in FIG. 2, often used with an integral planter. The central commodity tank 142 may be positioned on a mainframe 98 of the agricultural machine 100 and coupled to a blower or fan 32. The blower or fan 32 may be operably driven by a hydraulic, electric or other motor. The blower or fan 32 is configured to direct pressurized air through an air-flow manifold 34 and to a nozzle assembly 36 at a lower or bottom portion of the central commodity tank 142. The manifold 34 and the central commodity tank 142 may be included in a central commodity assembly 160, as suggested by FIG. 4. The manifold 34 is movable between various configurations or positions to control volume of commodity distributed to the intermediate tanks 144, 146, 148. For example, the manifold 34 may include a plurality of valves (e.g. electrically controlled solenoid valves) configured to open and close to facilitate or block airflow to each intermediate tank 144, 146, 148.

Figure 4:
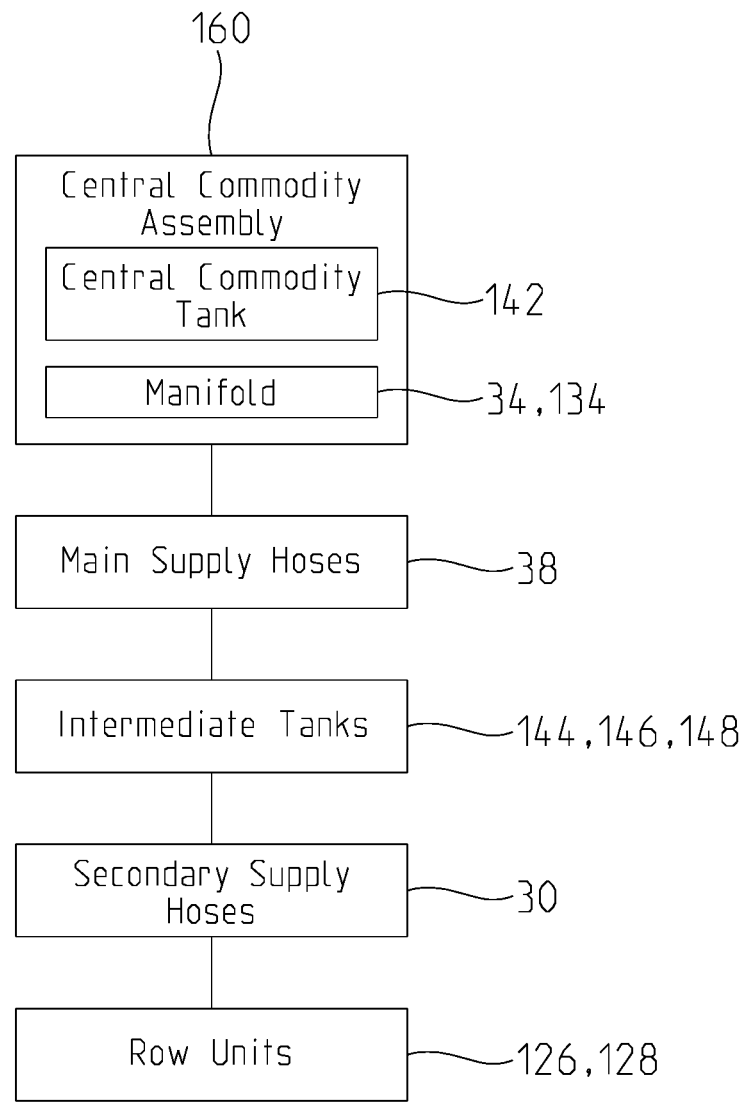
FIG. 4 is a diagrammatic view of an agricultural machine showing components used to distribute commodity to the soil during an agricultural operation.

As suggested by FIGS. 2 and 4, commodity (e.g., liquid or dry fertilizer or seed) is deposited into the central commodity tank 142, gravity and the shape and orientation of the tank 142 cause the product to flow toward the nozzle assembly 36 for distribution through main supply hoses 38 coupled thereto. While only a single main supply hose 38 is shown in FIG. 2, it should be appreciated that additional main supply hoses 38 may be present (see FIG. 1). At their first ends, the main supply hose 38 are coupled to and extend from product outlets of the commodity tank 142. At their second ends, the main supply hoses 38 are coupled to at least one intermediate tank, such as the intermediate tanks 144, 146, 148, as shown in FIG. 1.

Figure 3:
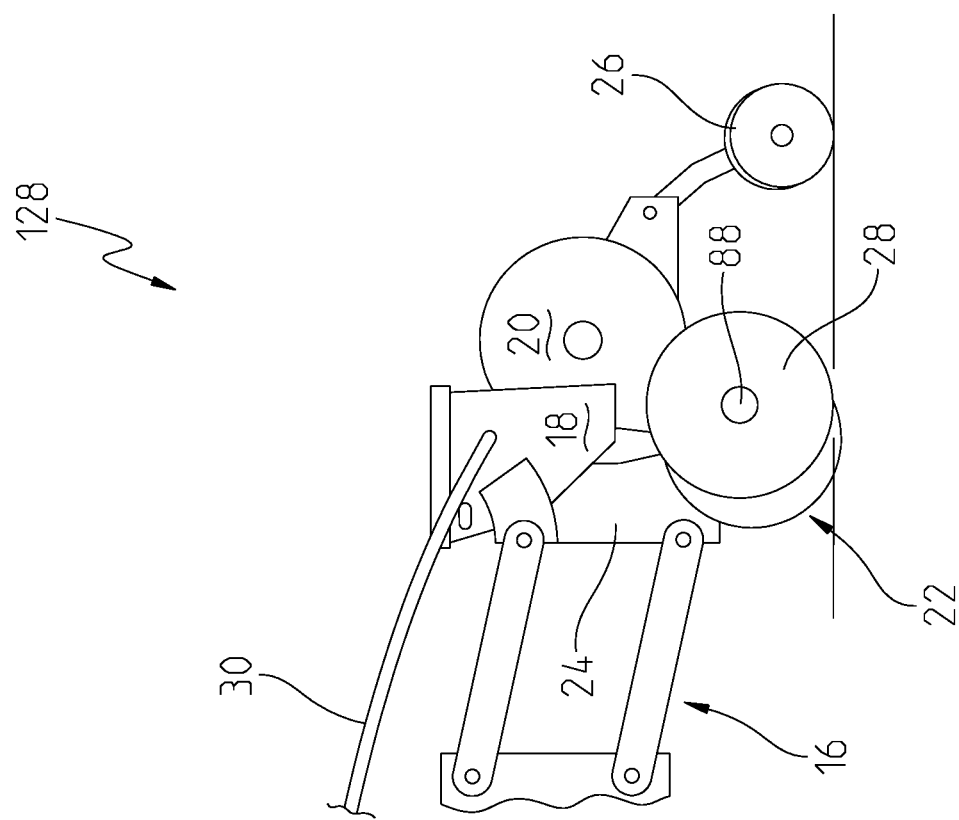
FIG. 3 is a side view of a row unit that receives commodity from an intermediate tank via a secondary supply hose.

As shown in the illustrative embodiment of FIG. 3, each row unit 128 may include a linkage assembly 16 for coupling the row unit 128 to a frame. For example, the linkage assembly 16 may be pivotably coupled to the frame 102, which allows the row unit 128 to move vertically relative to frame 102 to follow the ground contours during an agricultural operation. The row unit 128 may also include a gauge wheel 28, which in the illustrative embodiment, is positioned adjacent a furrow opener 22. The gauge wheel 28 may be vertically adjustable relative to the furrow opener 22 to vary the depth of the furrow which is cut into the soil by the furrow opener 22. The row unit 128 may also include a hopper 18 for holding commodity such as fertilizer, seed, or any other suitable product, and a meter 20 for metering out commodity received by the hopper 18. The furrow formed by the furrow opener 22 receives metered seed (or other commodity) from the meter 20. The commodity may be transferred to the furrow from the meter 20 by a tube 24. A closing assembly 26 may be coupled to each row unit 128 and may be used to close the furrow with the seed or other commodity contained therein. In one embodiment, the meter 20 is a vacuum seed meter, although in alternative embodiments other types of meters using other mechanical assemblies or positive air pressure may also be used for metering seed or other product. As described above, the present disclosure is not limited to dispensing seed. Rather, the principles and teachings of the present disclosure may also be used to apply non-seed products (e.g., liquid or dry fertilizer) to the field.

In some embodiments, e.g., application of liquid fertilizer, the agricultural machine 100 may include volumetric metering device positioned at a base of the central commodity tank 142, which may be referred to herein as a volumetric metering manifold 134. The manifold 134 is movable between various configurations or positions to control volume of commodity distributed to the intermediate tanks 144, 146, 148. For example, the manifold may include at least one valve configured to open and close to facilitate or block passage of commodity to each intermediate tank 144, 146, 148. The manifold 134 and the central commodity tank 142 may be included in a central commodity assembly 160, as suggested by FIG. 4.

Referring now to FIGS. 1, 2, and 4, the agricultural machine 100 may further include a plurality of secondary supply hoses 30. Each secondary supply hose 30 is coupled at a first end to an intermediate tank 144, 146, 148 and at a second end to a row unit 126, 128. For example, as suggested by FIG. 4, secondary supply hoses 30 are coupled to and facilitate commodity flow between the intermediate tanks 146, 148 and the hoppers 18 of the row units 128. Likewise, other secondary supply hoses 30 are coupled to and facilitate commodity flow between the intermediate tans 144 and the hoppers 18 of the row units 126. In this arrangement, as suggested by FIG. 4, commodity may be directed from the at least one central commodity tank 142 through the main supply hoses 38 to the intermediate tanks 144, 146, 148, where it may be temporarily stored. The commodity may then be directed from the intermediate tanks 144, 146, 148 through the secondary supply hoses 30 to the row units 126, 128, which provide the commodity to the soil.

Figure 5:
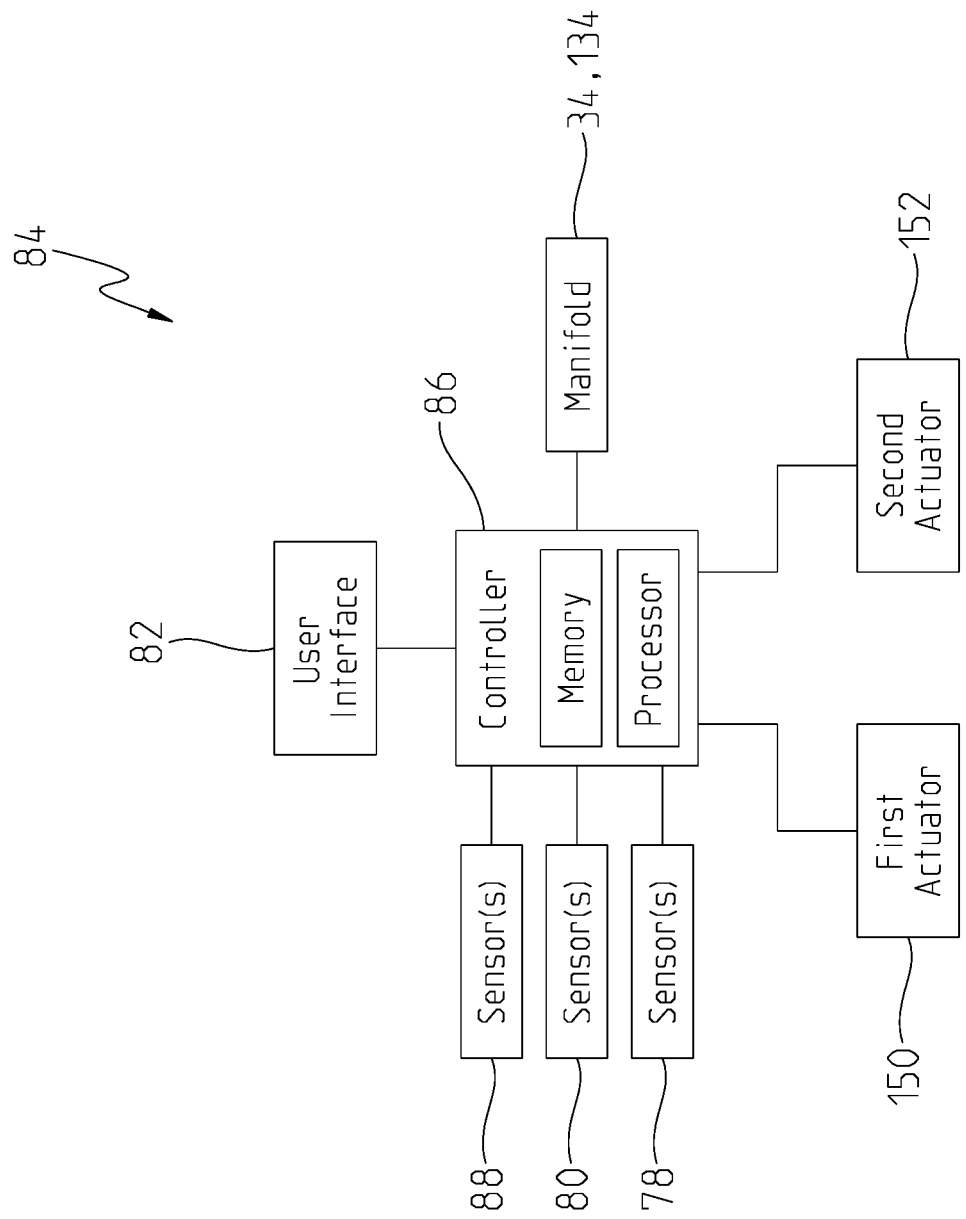
FIG. 5 is a diagrammatic view of a control system having a controller, a plurality of sensors and a manifold, which is coupled to at least one central commodity tank.

Referring now to FIG. 5, a diagrammatic view of a control system 84 of the agricultural machine 10 is shown. The control system 84 includes a controller 86 having a memory and a processor configured to execute instructions (i.e., algorithmic steps) stored on the memory. The controller 86 may be a single controller or a plurality of controllers operatively coupled to one another. The controller 86 may be housed by the agricultural machine 100 or positioned remotely, away from the agricultural machine 100. The controller 86 may be hardwired or connected wirelessly to other components of the agricultural machine 100 via Wi-Fi, Bluetooth, or other known means of wireless communication.

Referring still to FIG. 5, in some embodiments, the control system 84 further includes at least one sensor 88 configured to measure the downforce of the row units 128. It should be appreciated that the at least one sensor 88, may also be coupled to and configured to measure the downforce of the row units 126. Each sensor 88 is operatively coupled to the controller 86 and configured to send a signal to the controller 86 indicative of the measured downforce at the gauge wheel 28 of the row unit 128, for example. While shown in FIG. 3 as a sensor that is coupled to the gauge wheel 28 to sense the downforce at the row unit 128, the sensor 88 could take the form of any operational characteristic sensor described in U.S. application Ser. No. 17/731,643. As such, the sensor 88 may be configured to measure a characteristic associated with a ground engaging tool of the agricultural machine 100, such as a row unit 126, 128 or a wheel assembly 130, 132, and in each case the sensor 88 is configured to send a signal to the controller 86 indicative of the measured value. In some embodiments, the controller 86 is configured to compare the measured value from the sensor 88 to a desired value, and if the comparison is indicative of an insufficient downforce for the row units 128, then the controller 86 may adjust the manifold 34, 134 to cause distribution of additional commodity to the first intermediate tank 146 or the second intermediate tank 148 to achieve the desired downforce at the row units 128. It should be appreciated that the desired downforce may be a pre-set value associated with the agricultural machine 100 or a value input by a user. As such, the control system 84 may include a user interface 82 operatively coupled to the controller 86 and configured to receive signals therefrom indicative of the desired value(s).

In some embodiments, the control system 84 further include a soil sensor 78, which is operatively coupled to the controller 86 and configured to send signals to the controller 86 indicative of a characteristic of the soil such as soil density. In some embodiments, a contour map of the terrain to be traversed by the agricultural machine 100 may be stored on the memory of the controller 86. In an exemplary embodiment, if the controller 86 determines based on the contour map, that the downforce margin for row units 128 (for example) will be insufficient based on the upcoming terrain, then the controller 86 may adjust the manifold 34, 134 to cause distribution of additional commodity to the first intermediate tank 146 or the second intermediate tank 148 to achieve the desired downforce. It should be appreciated that the controller 86 may be configured to receive signals from the user interface 82 indicative of the desired downforce.

Referring still to FIG. 5, in some embodiments, the control system 84 includes at least one sensor 80 configured to measure the volume of commodity in each intermediate tank 144, 146, 148. In the illustrative embodiment the sensors 80 are coupled to each intermediate tank 144, 146, 148; however, the sensors 80 could take the form of any product characteristic sensor described in U.S. application Ser. No. 17/731,643. As such, each sensor 80 is configured to measure a characteristic associated with the commodity stored in the product storage system 140 (e.g., in the intermediate tanks 144, 146, 148), and each sensor 80 is configured to send a signal to the controller 86 indicative of the measured value(s).

In some embodiments, the controller 86 is configured to compare the measured volume of commodity in the intermediate tank 146 to a first predetermined volume maximum for the intermediate tank 146, and if the measured volume of commodity in the intermediate tank 146 is below the first predetermined volume maximum, then the controller 86 is configured to move the manifold 34, 134 to cause distribution of additional commodity to the intermediate tank 146. In some embodiments, the first volume maximum may be 75% of the total volume of the intermediate tank 146, yet in other embodiments, the first volume maximum may be a greater percentage, such as 90% of the total volume of the intermediate tank 146. It should be appreciated that the first volume maximum is less then the total volume of the intermediate tank 146, which allows for additional commodity to be distributed to the intermediate tank 146, above the volume maximum, which provides additional downforce to the row units 128. It should also be appreciated that while certain algorithmic steps recited herein are described with respect to the intermediate tank 146, the description is equally applicable to each intermediate tank 144, 146, 148 and their corresponding row units 126, 128.

In some embodiments, the controller 86 is configured to compare the measured downforce of the row units 128 (e.g., as measured by the at least one sensor 88) to a desired downforce of the row units 128 stored in the memory. In some embodiments, in response to determining that the measured downforce of the row units 128 is less than the desired downforce for row units 128, the controller 86 is configured to move the manifold 34, 134 such that additional commodity is distributed to the intermediate tank 146 causing the volume of commodity in the intermediate tank 146 to exceed the first volume maximum for the intermediate tank 146. In some embodiments, if the measured volume of commodity in the intermediate tank 146 is greater than an additional predetermined volume maximum for the intermediate tank 146, which is greater than the first predetermined volume maximum, then the controller 86 does not cause the manifold 34, 134 to distribute additional commodity to the first intermediate tank 146. In some embodiments, the additional predetermined volume maximum may be the total volume of the intermediate tank 146. The first volume maximum and the additional volume maximum may each be a pre-set values associated with the agricultural machine 100 or a values input by a user. As such, the controller 86 may be configured to receive signals from the user interface 82 indicative of the first volume maximum and/or the additional volume maximum.

As described above, the actuators 150, 152 may cooperate with other components to achieve a desired downforce margin for row units 126, 128 of various sections of the frame 102. For example, the controller 86 is operatively coupled to the first and second actuators 150, 152 and is configured to adjust at least one of the first and second actuators 150, 152 to redistribute weight across the frame 102 in response to the measured downforce of the row units 126, 128.

In some embodiments, the controller 86 is configured to adjust the at least one of the first actuator 150 and the second actuator 152, but only to a predetermined limit (e.g., extension limit for the actuator). Similarly, as described herein, in some embodiments, the controller 86 is configured to adjust the manifold 34, 134 to a configuration which causes commodity to be distributed to an intermediate tank 144, 146, 148 up to a predetermined volume limit (e.g., a volume maximum). The predetermined limits may be a pre-set value associated with the agricultural machine 100 or value input by a user, and as such, the controller 86 may be configured to receive signals from the user interface 82 indicative of the predetermined limit.

In some embodiments, the controller 86 is configured to adjust at least one of the first actuator 150 and the second actuator 152 to the predetermined limit prior to moving the manifold 34, 134. In other words, it is only after the actuator 150, 152 reaches its predetermined limit that the controller 86 is configured to adjust the manifold 34, 134. In other embodiments, it is only after the commodity in an intermediate tank 144, 146, 148 reaches a volume maximum that the controller 86 is configured to adjust the corresponding actuator 150, 152. These algorithmic steps allow for cooperation between (i) adjustment of actuators 150, 152 and distribution of commodity across various intermediate tanks 144, 146, 148 to ensure that adequate downforce is provided at each row unit 126, 128 of the agricultural machine 100.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A system for distributing commodity for an agricultural machine comprising:
   a frame including: a center section, a first wing section pivotably coupled to the center section, and a second wing section pivotably coupled to the center section and positioned opposite the first wing section;
   a product storage system including: (i) at least one central commodity tank configured to store commodity usable in an operation of the agricultural machine; (ii) a first intermediate tank positioned on the first wing section of the frame and configured to receive commodity from the at least one central commodity tank; and (iii) a second intermediate tank positioned on the second wing section of the frame and configured to receive commodity from the at least one central commodity tank;
   a manifold coupled to the at least one central commodity tank, wherein the manifold is movable to control a volume of commodity distributed to the first intermediate tank and the second intermediate tank;
   a first group of row units configured to receive commodity from the first intermediate tank and to distribute the commodity to terrain traversed by the agricultural machine;

a second group of row units configured to receive commodity from the second intermediate tank and to distribute the commodity to the terrain traversed by the agricultural machine;

a first plurality of sensors configured to measure the downforce of the first group of row units;

a second plurality of sensors configured to measure the downforce of the second group of row units; and a controller operatively coupled to the first plurality of sensors and the second plurality of sensors and configured to receive signals therefrom indicative of the measured downforce of the first group of row units and the second group of row units;

wherein the controller is operatively coupled to the manifold and configured to move the manifold in response to the measured downforce of the first group of row units and the second group of row units.

2. The system of claim 1, wherein the controller is configured to compare the measured downforce of the first group of row units to a desired downforce of the first group of row; and wherein in response to determining that the measured downforce of the first group of row units is less than the desired downforce of the first group of row units, the controller is configured to move the manifold such that additional commodity is distributed to the first intermediate tank.

3. The system of claim 2, further comprising an additional sensor operatively coupled to the controller and configured to measure a volume of commodity in the first intermediate tank;

wherein the additional sensor is configured to send signals to the controller indicative of the volume of commodity in the first intermediate tank;

wherein the controller is configured to compare the volume of commodity in the first intermediate tank to a predetermined volume maximum of the first intermediate tank; and wherein in response to determining that the measured downforce of the first group of row units is less than the desired downforce of the first group of row units, the controller is moves the manifold such that additional commodity is distributed to the first intermediate tank only if the volume of commodity in the first intermediate tank is less than the predetermined volume maximum.

4. The system of claim 1, wherein the at least one central commodity tank is not positioned on the first wing section or the second wing section of the frame.

5. The system of claim 1, wherein the at least one central commodity tank is not positioned on the frame.

6. The system of claim 1, further comprising:

a first main supply hose coupled at a first end to the at least one central commodity tank and at a second end to the first intermediate tank; and a second main supply hose coupled at a first end to the at least one central commodity tank and at a second end to the second intermediate tank.

7. The system of claim 6, further comprising:

a first secondary supply hose coupled at a first end to the first intermediate tank and at a second end to a first row unit of the first group of row units; and a second secondary supply hose coupled at a first end to the first intermediate tank and at a second end to a second row unit of the first group of row units.

8. The system of claim 1, wherein the first intermediate tank and the second intermediate tank are included in a plurality of intermediate tanks, at least two of which are coupled together to facilitate transfer of commodity therebetween.

9. The system of claim 1, further comprising:

a first actuator coupled to the center section and to the first wing section;

a second actuator coupled to the center section and to the second wing section;

wherein the controller is configured to adjust at least one of the first actuator and the second actuator to redistribute weight across the frame.

10. The system of claim 9, wherein the controller is configured to adjust at least one of the first actuator and the second actuator to redistribute weight across the frame based on the measured downforce of the first group of row units and the second group of row units.

11. The system of claim 9, wherein, based on the measured downforce of the first group of row units and the second group of row units, the controller is configured to adjust at least one of the first actuator and the second actuator to a predetermined limit to redistribute weight across the frame prior to moving the manifold.

12. The system of claim 9, wherein, based on the measured downforce of the first group of row units and the second group of row units, the controller is configured to move the manifold to cause commodity to be distributed to at least one of the first intermediate tank and the second intermediate tank up to a predetermined limit prior to adjusting the at least one of the first actuator and the second actuator.

13. A system for distributing commodity for an agricultural machine comprising:

a frame extending laterally across a first side and a second side;

a product storage system including: (i) at least one central commodity tank configured to store commodity usable in an operation of the agricultural machine; (ii) a first intermediate tank positioned on the first side of the frame and configured to receive commodity from the at least one central commodity tank; and (iii) a second intermediate tank positioned on the second side of the frame and configured to receive commodity from the at least one central commodity tank;

a manifold coupled to the at least one central commodity tank, wherein the manifold is movable between at least two positions to control a volume of commodity distributed to the first intermediate tank and the second intermediate tank;

a first group of row units configured to receive commodity from the first intermediate tank and to distribute the commodity to terrain traversed by the agricultural machine;

a second group of row units configured to receive commodity from the second intermediate tank and to distribute the commodity to the terrain traversed by the agricultural machine;

a first sensor configured to measure the volume of commodity in the first intermediate tank; and a second sensor configured to measure the volume of commodity in the second intermediate tank;

a controller operatively coupled to the first sensor and the second sensor and configured to receive signals therefrom indicative of the volume of commodity in the first intermediate tank and the volume of commodity in the second intermediate tank, respectively;

wherein the controller is configured to compare the measured volume of commodity in the first intermediate tank and the second intermediate tank to predetermined volume maximums for the first intermediate tank and the second intermediate tank, respectively; and wherein if the measured volume of commodity in the first intermediate tank or the second intermediate tank is below the predetermined volume maximum, the controller is configured to move the manifold to cause distribution of additional commodity to the first intermediate tank or the second intermediate tank, respectively.

14. The system of claim 13, wherein the predetermined volume maximums for the first intermediate tank and the second intermediate tank are at least 90% of the total volume of the first intermediate tank and the second intermediate tank, respectively.

15. The system of claim 13, wherein the predetermined volume maximums for the first intermediate tank and the second intermediate tank are at least 75% of the total volume of the first intermediate tank and the second intermediate tank, respectively.

16. The system of claim 13, wherein the controller is configured to compare the measured downforce of the first group of row units to a desired downforce of the first group of row; and wherein in response to determining that the measured downforce of the first group of row units is less than the desired downforce of the first group of row units, the controller is configured to move the manifold such that additional commodity is distributed to the first intermediate tank causing the volume of commodity in the first intermediate tank to exceed the volume maximum for the first intermediate tank.

17. The system of claim 16, wherein if the measured volume of commodity in the first intermediate tank is greater than an additional predetermined volume maximum for the first intermediate tank, which is greater than the predetermined volume maximum, then the controller does not cause the manifold to distribute additional commodity to the first intermediate tank.

18. A method of distributing commodity for an agricultural machine comprising:

distributing commodity from at least one central commodity tank to a first intermediate tank positioned on a first side of a frame;

distributing commodity from the at least one central commodity tank to a second intermediate tank positioned on a second side of the frame;

distributing commodity from the first intermediate tank to a first group of row units coupled to the frame, which distribute the commodity to terrain being traversed by the agricultural machine;

distributing commodity from the second intermediate tank to a second group of row units coupled to the frame, which distribute the commodity to the terrain being traversed by the agricultural machine;

adjusting a manifold coupled to the at least one central commodity tank to stop distribution of commodity to the first intermediate tank and the second intermediate tank; and re-adjusting the manifold in response to characteristics of the terrain to be traversed by the agricultural machine to distribute additional commodity to at least one of the first intermediate tank and the second intermediate tank.

19. The method of claim 18, wherein re-adjusting the manifold in response to characteristics of the terrain to be traversed by the agricultural machine includes:

analyzing a contour map of the terrain to be traverse by the agricultural machine; and re-adjusting the manifold in response to the contour map of the terrain to be traverse by the agricultural machine.

20. The method of claim 18, further comprising: sensing a characteristic of the soil during operation of the agricultural machine prior to the first group of row units or the second group of row units traversing the soil;

wherein re-adjusting the manifold in response to characteristics of the terrain to be traversed by the agricultural machine includes: re-adjusting the manifold in response to the sensed characteristic of the soil.

* * * * *